United States Patent
Flores et al.

(10) Patent No.: US 10,203,002 B2
(45) Date of Patent: Feb. 12, 2019

(54) BEARING FOR INTERNAL COMBUSTION ENGINES

(71) Applicants: Mahle International GmbH, Stuttgart (DE); Mahle Metal Leve S/A, Jundiai-Sp (BR)

(72) Inventors: Denys Flores, Sao Paulo (BR); Paulo R. Vieira De Morais, São Bernardo do Campo (BR); Matos C. Sandra, Diadema (BR)

(73) Assignees: Mahle International GmbH (DE); Mahle Metal Leve S/A (BR)

( * ) Notice: Subject to any disclaimer, the term of this patent is extended or adjusted under 35 U.S.C. 154(b) by 37 days.

(21) Appl. No.: 14/911,964

(22) PCT Filed: Aug. 15, 2014

(86) PCT No.: PCT/EP2014/067500
§ 371 (c)(1),
(2) Date: Feb. 12, 2016

(87) PCT Pub. No.: WO2015/022426
PCT Pub. Date: Feb. 19, 2015

(65) Prior Publication Data
US 2016/0265591 A1    Sep. 15, 2016

(30) Foreign Application Priority Data
Aug. 15, 2013    (BR) .......................... 102013020846.9

(51) Int. Cl.
*B32B 15/00*    (2006.01)
*F16C 33/12*    (2006.01)
*F16C 33/14*    (2006.01)

(52) U.S. Cl.
CPC .......... *F16C 33/121* (2013.01); *F16C 33/124* (2013.01); *F16C 33/125* (2013.01);
(Continued)

(58) Field of Classification Search
CPC .... F16C 33/121; F16C 33/124; F16C 33/125; F16C 33/127; F16C 2204/10;
(Continued)

(56) References Cited

U.S. PATENT DOCUMENTS 6,357,919 B1    3/2002    Kawachi et al.
6,575,635 B1 *  6/2003    Tsuji ..................... F16C 33/124
                                              384/276

FOREIGN PATENT DOCUMENTS

DE    102006060474 A1    6/2008
DE    102011013881 B3    5/2012
(Continued)

OTHER PUBLICATIONS

Zhu, Interfacial Reactions Between Sn—Zn Alloys and Ni Substrates, 2010, Journal of Electronic Materials, vol. 39, 209-214.*
(Continued)

*Primary Examiner* — David Sample
*Assistant Examiner* — Mary I Omori
(74) *Attorney, Agent, or Firm* — Fishman Stewart PLLC

(57) ABSTRACT

A bearing for an internal combustion engine may include a steel support layer. A coating layer containing a Cu alloy may be laid over the steel support layer. A Ni-based anti-diffusion barrier layer may be laid over the coating layer, and an anti-friction layer containing a matrix of Sn—Zn and Zn precipitates may be laid over the anti-diffusion barrier layer.

19 Claims, 1 Drawing Sheet

(52) U.S. Cl.
CPC ............ *F16C 33/127* (2013.01); *F16C 33/14* (2013.01); *F16C 2204/10* (2013.01); *F16C 2204/12* (2013.01); *F16C 2204/34* (2013.01); *F16C 2204/50* (2013.01); *F16C 2204/52* (2013.01); *F16C 2223/30* (2013.01); *F16C 2223/70* (2013.01); *F16C 2240/40* (2013.01); *F16C 2240/60* (2013.01); *F16C 2360/22* (2013.01)

(58) Field of Classification Search
CPC .............. F16C 2223/30; F16C 2360/22; F16C 2204/50; B23K 35/262
USPC .......................................... 428/646; 384/276
See application file for complete search history.

(56) References Cited

FOREIGN PATENT DOCUMENTS

| | | |
|---|---|---|
| EP | 2365109 A1 | 9/2011 |
| GB | 2321468 A | 7/1998 |
| JP | 111-82514 A | 3/1999 |
| JP | 2001-132754 A | 5/2001 |
| JP | 2002-310158 A | 10/2002 |
| JP | 2005-068516 A | 3/2005 |
| JP | 2006-300246 A | 11/2006 |

OTHER PUBLICATIONS

Seremeti et al., machine translation EP 2365109 Description, Sep. 14, 2011 (Year: 2011).*
English abstract for EP2365109.
Japanese Office Action dated Mar. 6, 2018 corresponding to related Japanese Patent Application No. 2016-533930.
English abstract for Jp-H11-82514.
English abstract for Jp-2006300246.
Japanese Notice of Allowance mailed Nov. 6, 2018 for Jp 2016-533930.

* cited by examiner

BEARING FOR INTERNAL COMBUSTION ENGINES

CROSS-REFERENCE TO RELATED APPLICATIONS

This application claims priority to Brazilian Patent Application No. 10 2013 020 846 9, filed Aug. 15, 2013, and International Patent Application No. PCT/EP2014/067500, filed Aug. 15, 2014, both of which are hereby incorporated by reference in their entirety.

TECHNICAL FIELD

This invention refers to a bearing for internal combustion engines, generally used on connecting rods or as central bearings in the engine blocks of internal combustion engines.

BACKGROUND

In recent years, in order to minimise the emission of noxious gases to the environment, a series of technologies has been incorporated into internal combustion engines. The reduction of emissions of these gases is connected, amongst other factors, with an increase in the thermal output of the internal combustion engine, and consequently the reduction of specific fuel consumption.

As a consequence, new engines have gone through a process of "downsizing", which consists in reducing their volume and weight, maintaining or increasing their specific power. This involves greater thermal and mechanical loads on all the components, which is further accentuated in the case of moving components, because of the wear and attrition present.

One of the components most subject to the forces generated by internal combustion engines is the connecting rod, which forms the link between the piston and the crankshaft in order to transform the linear movement of the piston into rotational movement. In this way, the connecting rod is, one the one hand, attached to the piston, and, on the other hand, attached to the crankshaft. According to this descriptive report, the end of the connecting rod attached to the piston is known as the top end, and the end of the connecting rod attached to the crankshaft is known as the bottom end.

At the bottom end, between the connecting rod and the crankshaft, a bearing is used made of a softer material in order to reduce the attrition and wear between the components. At the top end of the connecting rod, a bush is fitted between the eye and pin of the piston, also in order to reduce the attrition between the components. The bearings used on the connecting rods also has the function of allowing for easy assembly, withstanding misalignments in assembly and the shaft and accommodating particulates, as is well known to the technicians in this field. Although the example mentioned here makes reference to the bearings fitted to the connecting rods, it is true that bearings can be used on other components of a combustion engine, such as the crankshaft and the camshaft.

The bearings for these applications usually consist of a layer of carbon steel coated on their internal diameter with an alloy based on Pb and Sn (known as Babbitts or White Metal) or based on Al associated with Sn in different concentrations, or even of copper alloys containing different concentrations of Pb. These bearings made of copper alloys also have an additional coating based on Pb and Sn.

However, as mentioned above, the conditions of operation of internal combustion engines are becoming increasingly severe, and bearings made of alloys based on Pb and Sn, and those based on Al, collapse and do not guarantee the reliability and durability required. Therefore, in other words, current technologies are not sufficient to meet the demands of new engines, including tri-metallic bearings based on bronze (copper alloys).

To this must also be added the fact that the use of Pb has been strongly discouraged, and, in some countries, banned, bearing in mind the environmental risks associated with this element.

Other solutions to obtain a bearing free of Pb can be found in technical state documents U.S. Pat. No. 6,357,919 and GB 2,321,468.

Document GB 2,321,468 refers to a bearing that contains: a layer of metal; a layer of Cu alloy laid over the metal layer; an intermediate layer of Cu—Zn laid over the layer of Cu alloy and containing 20 to 50% Zn by weight; and an anti-friction layer based on Sn or Al laid over the intermediate layer.

In this document, the anti-friction layer may contain, amongst other elements, 0.1 to 25% Zn by weight, which leads to a lower fraction by volume of Zn precipitates and lower hardness. Apart from this, it is worth noting that the intermediated Cu—Zn layer displays lower resistance to seizing up as it does not contain a solid lubricating element and is characterised as a high hardness metallic layer.

Furthermore, document U.S. Pat. No. 6,357,919 describes a bearing containing: a layer of metal; an intermediate layer laid over the metal layer; and an anti-friction layer laid over the intermediate layer. This anti-friction layer is free of Pb, and is made of an alloy based on Sn, which contains between 2 and 10% Ag by weight. This Sn-based alloy may also contain between 0.1 and 25% by weight of one or more elements from amongst Cu, Sb, Zn and Ni.

However, this North American document does not put forward a solution that is advantageous from the economic point of view, as it uses precious metals, such as Ag, which increases the price of the bearing too much. Apart from this, it is worth remembering that silver is also disadvantageous from the point of view of electrochemical potential suitable for the higher rates of deposition using the electrochemical method.

Therefore, it will be noted that in the current state of the art, bearings display innumerable disadvantages, particularly regarding aspects such as load capacity, resistance to seizing up, resistance to wear, the use of high cost materials, or even the use of materials harmful to the environment.

However, in order to solve the problems given as examples here, and other problems encountered in the current state of the art, this invention has as one of its aims, that of providing a bearing that does not use materials or elements harmful to the environment, such as lead.

Another of the objectives of this invention is to provide a bearing with a greater load capacity in relation to bearings in the current state of the art.

It is also one of the objectives of this invention to provide a bearing that uses low cost materials in order to make producing it less burdensome.

Additionally, it is one of the objectives of this invention to provide a bearing that displays higher resistance to wear and to seizing up.

Because of its inherent characteristics, this invention may also solve other problems in the current state of the art not put forward here as examples, as the role discussed here of bearings and their problems is more by way of an example than exhaustive.

SUMMARY

In order to get round the drawbacks of the state of the art described above, this invention puts forward a bearing for internal combustion engines containing: a steel support layer; a coating layer containing a Cu alloy, laid over the steel support layer; an anti-diffusion barrier layer based on Ni laid directly over the coating layer; and an anti-friction layer containing a matrix of Sn—Zn and Zn precipitates, with the said anti-friction layer being laid over the anti-diffusion barrier layer.

In accordance with additional or alternative realisations of this invention, the following characteristics and their possible variants may also be present, alone or in combination:
   the anti-diffusion barrier layer contains 90 to 100% Ni by weight.
   the anti-diffusion barrier layer varies between 1 and 10 µm in thickness.
   the anti-friction layer contains 25%-40% Zn by weight
   the anti-friction layer contains 27 to 32% Zn by weight.
   the anti-friction layer contains 60 to 75% Sn by weight.
   the anti-friction layer varies between 5 and 30 µm in thickness.

This invention additionally puts forward a bearing for internal combustion engines containing: a steel support layer; a coating layer containing a Cu alloy and laid over the steel support layer; an anti-diffusion barrier layer based on Ni laid over the coating layer; an anti-friction layer containing a matrix of Sn—Zn and Zn precipitates, with this anti-friction layer being laid over the anti-diffusion barrier layer; an intermediate layer based on Ni—Zn, formed between the anti-diffusion barrier layer and the anti-friction layer when the bearing is in use; and a superimposed layer based on Zn, formed over the anti-friction layer when the bearing is in use.

In relation to the bearing described above, and in accordance with additional or alternative realisations of this invention, the following characteristics and their possible variants may also be present, alone or in combination:
   the superimposed layer is formed over the anti-friction layer when the bearing starts to be used.
   the intermediate layer is formed between the anti-diffusion barrier layer and the anti-friction layer, after the formation of the superimposed layer, with the passage of time of use of the bearing and the increase in temperature.
   the intermediate varies in thickness between 1 and 5 µm.
   the superimposed layer contains 90 to 100% Zn by weight.
   the superimposed layer contains 0 to 10% Sn by weight.
   the superimposed layer varies in thickness between 1 and 3 µm.
   the anti-diffusion barrier layer contains 90-100% Ni by weight.
   the anti-diffusion barrier varies in thickness between 1 and 10 µm.
   the anti-friction layer contains 25 to 40% Zn by weight.
   the anti-friction layer contains 27 to 32% Zn by weight.
   the anti-friction layer contains 60 to 75% Sn by weight.
   the anti-friction layer varies in thickness between 5 and 30 µm.

BRIEF DESCRIPTION OF THE DRAWINGS

The objectives, functional improvements and advantages of the bearing covered by this invention will be apparent to technicians in the field from the description made in relation to a particular realisation, which makes reference to the attached figures. The figures are diagrammatic, and their dimensions or proportions may not reflect reality, as they seek merely to describe the invention in a didactic way, without imposing any limitations beyond those defined in the claims below, as follows:

DETAILED DESCRIPTION

The invention is now described in relation to the particular realisations of it, making reference to the attached figures. In the figures and in the description following, similar parts are marked throughout the descriptive report and in the figures with the same reference numbers. The figures are not necessarily to scale. Certain characteristics may be shown with the scale exaggerated or in some other way rather diagrammatically, and some details of conventional elements may not be represented, with the aim of bringing greater clarity and conciseness to this description. The invention is open to different forms of realisation. Specific realisations are described in detail and shown in the figures, on the understanding that they should be regarded as illustrative of their principles, and not intended to limit the invention merely to what is illustrated and described in this descriptive report. It must be recognised that the different illustrations of the realisations described below may be used separately or in any suitable combination to produce the same desired results.

Figure 1:
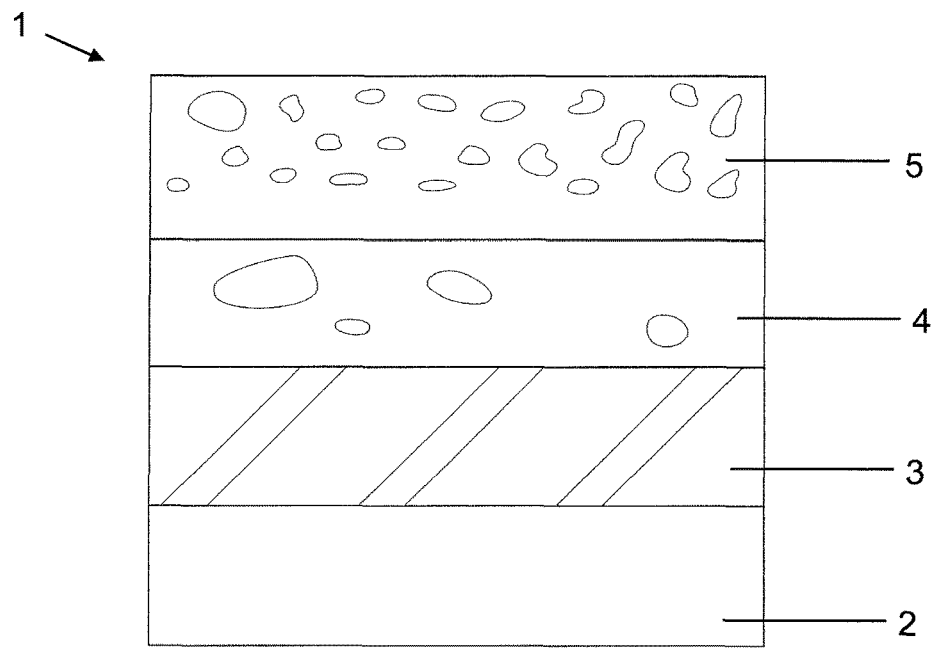
FIG. 1 is a diagrammatic representation of the layers contained in the bearing covered by this invention in accordance with an first realisation.

In a first realisation, illustrated in FIG. 1, bearing 1 in this invention includes a steel support layer 2, known as such in the state of the art. Over this steel support layer 2, there is a coating layer 3, which contains a Cu alloy, with this alloy being bronze, for example. Evidently, other copper alloys may be used to make the coating layer 3, as technicians in the field will be aware.

In this first realisation, bearing 1 in this invention also contains an anti-diffusion barrier layer 4 based on Ni, with this layer being laid over the coating layer 3. In particular realisations of this anti-diffusion barrier layer 4, its thickness may vary between 1 and 10 µm. Apart from this, in particular realisations, this anti-diffusion layer 4 may contain between 90 and 100% Ni by weight and up to 10% by weight of other materials, such as Cu, Zn or Sn, alone or in combination with each other.

Over the anti-diffusion barrier layer 4, there is an anti-friction layer 5, which contains a matrix of Sn—Zn, and hard Zn precipitates. In particular realisations, this anti-friction layer 5 contains 25 to 40% Zn by weight and 60 to 75% Sn by weight, and, more particularly, it may contain 27 to 32% Zn by weight and 68 to 73% Sn by weight. Apart from this, also in particular realisations, this anti-friction layer 5 may contain thicknesses of between 5 and 30 µm, apart from which its hardness may vary between 10 and 25 MHK0.001.

As it is possible to note, bearing 1 in this first realisation has a higher Zn content by weight in the anti-friction layer 5 in relation to the current state of the art, which brings substantial advantages, such as, for example, a higher fraction of hard Zn precipitates, greater hardness and greater wear resistance.

Apart from this, the fact that this anti-friction layer 5 has lower cost metals in its make-up, such as Zn, and does not use precious metals, means that it becomes an economically more viable solution than bearings in the current state of the art that use Ag for example.

Another advantage of the use of Zn, as opposed to precious metals such as silver (Ag) and indium (In) in the anti-friction layer 5 is the obtaining of a suitable electrochemical potential with a high rate of deposition, that may even reach twice the rates of deposition when compared with other anti-friction layers in bearings in the current state of the art based on Sn and free of Pb.

It is also worth mentioning that bearing 1 in this first realisation does not use Pb, and is therefore less harmful to the environment in relation to bearings in the current state of the art.

Figure 2:
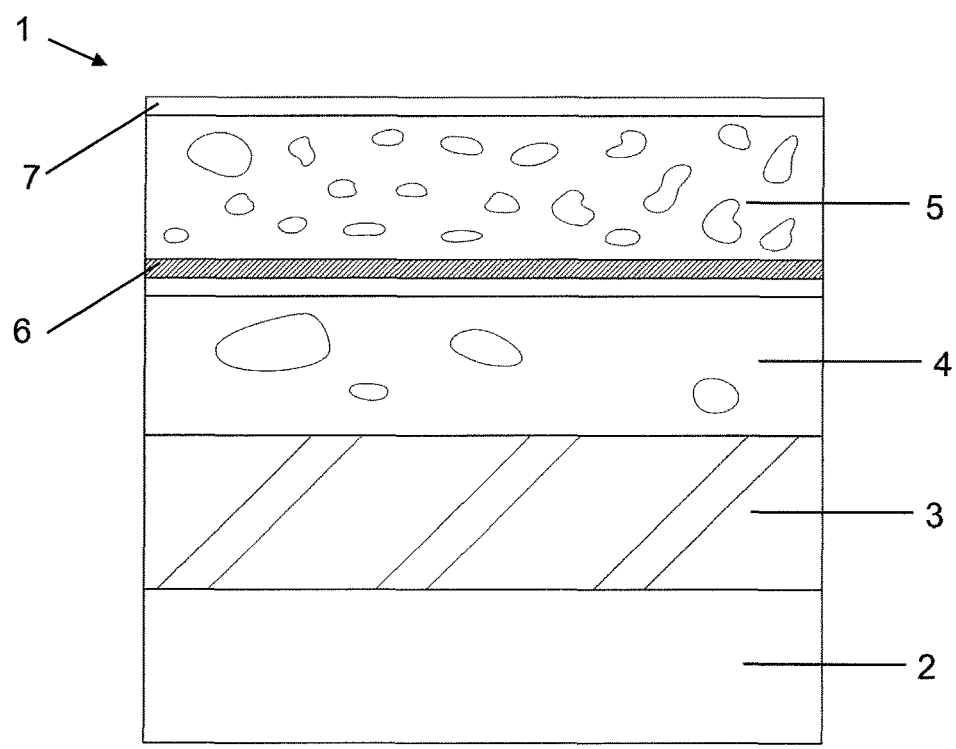
FIG. 2 is a diagrammatic representation of the layers contained in the bearing covered by this invention in accordance with a second realisation.

In a second realisation, illustrated in FIG. 2, bearing 1 in this invention also contains a steel support layer 2 and a coating layer 3 laid over the steel support layer 2, with these layers having the same characteristics as the first realisation of the invention.

Apart from this, in this second realisation, the bearing in this invention also includes: an anti-diffusion barrier layer 4; and an anti-friction layer 5, both having the characteristics described above for the first realisation of the invention.

In this second realisation, bearing 1 additionally includes: an intermediate layer 6 based on Ni—Zn, placed between the anti-diffusion barrier layer 4 and the anti-friction layer 5; and a superimposed layer 7, based on Zn and placed over the anti-friction layer.

The intermediate layer 6 and superimposed layer 7 have in common the characteristic of being formed when the bearing 1 is in use, which can occur, for example, when the internal combustion engine is in operation.

In this way, in the second realisation of the invention, the bearing 1, in an initial stage, without being in use, contains the following layers: steel support layer 2; coating 3; anti-diffusion barrier 4; and anti-friction 5. Following this, after it comes into use, the same bearing 1 comes to include the following layers: steel support 2; coating 3; anti-diffusion barrier 4; intermediate 6; anti-friction 5; and superimposed 7.

More precisely, on commencement of the use of bearing 1, the superimposed layer 7, which is Zn-based, is formed over the anti-friction layer 5. With the passage of time of use and rise in temperature, the intermediate layer 6 is formed between the anti-diffusion barrier layer 4 and the anti-friction layer 5.

In particular realisations, the intermediate layer 6 may contain thicknesses of between 1 and 5 μm, whilst the superimposed layer may contain thicknesses of between 1 and 3 μm.

Also in particular realisations, the superimposed layer may contain 90-100% Zn by weight and 0-10% Sn by weight.

The second realisation of this invention includes the advantages mentioned above in the description of the first realisation. Additionally, the second realisation includes other advantages, which will be described below.

The Ni—Zn based intermediate layer 6, formed after the start of use of bearing 1, provides a more efficient solution with regard to resistance to wear and seizing up, when compared to bearings that use an anti-diffusion barrier layer based Cu—Zn or pure Ni. Also, this intermediate layer 6 also blocks the diffusion of Sn towards the coating level 3, thereby preventing failures of the bearing by detachment.

Furthermore, the Zn-based superimposed layer 7 imparts greater wear resistance to the bearing 1.

Finally, it is worth emphasising as an advantage that the formation of the intermediate layer 6 and the superimposed layer 7 promotes a gradient of hardness to the multilayer structure of the bearing 1 in this invention. This gradient contributes towards increasing the load capacity and wear resistance.

Therefore, through its realisations, this invention achieves its aims and overcomes existing obstacles in bearings in the current state of the art.

In spite of the bearing in this invention being particularly useful in internal combustion engines, the bearing in this invention may be constructed for other types of applications and may display modifications in the way in which it is implemented, such that the scope for protection of the invention is limited not only to the content of the claims attached, but also includes possible equivalent variations.

The invention claimed is:
1. A bearing for an internal combustion engine, comprising:
   a steel support layer;
   a coating layer containing a Cu alloy laid over the steel support layer;
   a Ni-based anti-diffusion barrier layer laid over the coating layer;
   an anti-friction layer composed of a matrix of Sn—Zn and Zn precipitates disposed in the matrix of Sn—Zn, wherein the anti-friction layer is laid over the anti-diffusion barrier layer;
   a bearing-operation-activated superimposed layer composed of a Zn-based material defined on an outer surface of the anti-friction layer with respect to the steel support layer;
   wherein the anti-friction layer has a Zn content of 27% to 32% by weight; and
   wherein the Zn-based material contains 90-100% Zn by weight and the superimposed layer defines an outermost layer with respect to the steel support layer.

2. The bearing of claim 1, wherein the anti-diffusion barrier layer contains 90-100% Ni by weight.

3. The bearing of claim 1, wherein the anti-diffusion barrier layer has a thickness between 1 and 10 μm.

4. The bearing of claim 1, wherein the Zn-based material contains 0-10% Sn by weight.

5. The bearing of claim 1, wherein the anti-friction layer contains 68 to 73% Sn by weight.

6. The bearing of claim 1, wherein the anti-friction layer has a thickness between 5 and 30 μm.

7. A bearing for an internal combustion engine, comprising:
   a steel support layer;
   a coating layer including a Cu alloy laid over the steel support layer;
   a Ni-based anti-diffusion barrier layer laid over the coating layer;
   an antifriction layer containing a matrix of Sn—Zn and Zn precipitates disposed in the matrix of Sn—Zn, wherein the anti-friction layer is laid over the anti-diffusion barrier layer;
   a Ni—Zn-based intermediate layer disposed between the anti-diffusion barrier layer and the anti-friction layer during bearing operation; and
   a Zn-based superimposed layer disposed over an outer surface of the anti-friction layer during bearing operation with respect to the steel support layer, wherein the superimposed layer contains 90-100% Zn by weight and defines an outermost layer with respect to the steel support layer.

8. The bearing of claim 7, wherein the superimposed layer propagates over the outer surface of the anti-friction layer on the start of bearing operation.

9. The bearing of claim 8, wherein the intermediate layer propagates between the anti-diffusion barrier layer and the anti-friction layer after the propagation of the superimposed layer in response to exceeding at least one of a predetermined duration and a temperature increase threshold during bearing operation.

10. The bearing of claim 7, wherein the intermediate layer varies in thickness from 1 to 5 μm.

11. The bearing of claim 7, wherein the superimposed layer contains 0-10% Sn by weight.

12. The bearing of claim 7, wherein the superimposed layer varies in thickness from 1 to 3 μm.

13. The bearing of claim 7, wherein the anti-diffusion barrier layer contains 90-100% Ni by weight.

14. The bearing of claim 7, wherein the anti-diffusion barrier layer varies in thickness from 1 to 10 μm, and wherein the anti-diffusion barrier layer contains at least 90% by weight of Ni and up to 10% by weight of at least one of Cu, Zn and Sn.

15. The bearing of claim 7, wherein the anti-friction layer has a Zn content of 25-40% by weight.

16. The bearing of claim 15, wherein the anti-friction layer has the Zn content of 27-32% by weight and the thickness of the anti-friction layer extends from the intermediate layer to the outermost layer defined by the superimposed layer.

17. The bearing of claim 7, wherein the anti-friction layer contains 60-75% Sn by weight.

18. The bearing of claim 7, wherein the anti-friction layer has a thickness of from 5 to 30 μm and a hardness that varies between 10 and 25 MHK0.001.

19. A bearing for an internal combustion engine, comprising:
a steel support layer;
a coating layer including a Cu alloy laid over the steel support layer;
a Ni-based anti-diffusion barrier layer laid over the coating layer;
an anti-friction layer composed of a matrix of Sn—Zn and Zn precipitates disposed in the matrix of Sn—Zn, wherein the anti-friction layer is laid over the anti-diffusion barrier layer;
a Ni—Zn-based intermediate layer disposed between the anti-diffusion barrier layer and the anti-friction layer during bearing operation;
a Zn-based superimposed layer disposed on an outer surface of the anti-friction layer with respect to the steel support layer; and
wherein the anti-friction layer has a Zn content of 25% to 40% by weight, and wherein the Zn-based superimposed layer contains 90-100% Zn by weight and defines an outermost layer with respect to the steel support layer.

* * * * *